United States Patent
Nakata et al.

(10) Patent No.: US 7,364,814 B2
(45) Date of Patent: Apr. 29, 2008

(54) SEPARATOR OF A FUEL CELL AND A MANUFACTURING METHOD THEREOF

(75) Inventors: Hiromichi Nakata, Toyota (JP); Masayoshi Yokoi, Okazaki (JP); Kenji Shimoda, Nagoya (JP); Noboru Takayanagi, Tajimi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 52 days.

(21) Appl. No.: 10/452,224

(22) Filed: Jun. 3, 2003

(65) Prior Publication Data

US 2003/0228510 A1    Dec. 11, 2003

(30) Foreign Application Priority Data

Jun. 5, 2002    (JP)    ............... 2002-163733

(51) Int. Cl.
H01M 4/00    (2006.01)
H01M 2/14    (2006.01)

(52) U.S. Cl. .......................................... 429/44; 429/38

(58) Field of Classification Search .................. 429/44, 429/137, 141, 38, 39, 97.8, 97.1, 78, 69, 429/63, 61
See application file for complete search history.

(56) References Cited

U.S. PATENT DOCUMENTS 6,153,327 A * 11/2000 Dearnaley et al. ............ 429/40
6,372,376 B1 * 4/2002 Fronk et al. .................. 429/41
6,893,765 B1 * 5/2005 Nishida et al. ............... 429/34
2001/0033957 A1 * 10/2001 Nakata et al. ................ 429/34

FOREIGN PATENT DOCUMENTS

| EP | 0 955 686 A1 | 11/1999 |
| EP | 1 137 089 A2 | 9/2001 |
| EP | 1 148 566 A2 | 10/2001 |
| EP | 1 154 504 A | 11/2001 |
| EP | 1 231 655 A1 | 8/2002 |
| JP | 61-051770 AA | 3/1986 |
| JP | 11-144744 | 5/1999 |
| JP | 2000-67881 A | 3/2000 |
| JP | 2000-299117 | 10/2000 |
| JP | 2000-323148 | 11/2000 |

(Continued)

OTHER PUBLICATIONS

Japanese Office Action for Appln. No. JP 2002-163733 issued Apr. 4, 2006.

(Continued)

Primary Examiner—Patrick Joseph Ryan
Assistant Examiner—Ben Lewis
(74) Attorney, Agent, or Firm—Kenyon & Kenyon LLP

(57) ABSTRACT

A separator of a fuel cell includes a base material and a surface treatment layer formed on the base material. The surface treatment layer includes a base material-side portion made from metal and a base material opposite-side portion made from carbon formed at an atom level or composite materials of carbon and metal or semi-metal. The surface treatment layer may further include carbon particle composite layer formed on the base material opposite-side portion formed at an atom level. In a manufacturing method of the above separator of a fuel cell, the base material opposite-side portion is formed by dry coating.

11 Claims, 6 Drawing Sheets

FOREIGN PATENT DOCUMENTS

| | | | |
|---|---|---|---|
| JP | 2001-283872 A | 10/2001 | |
| JP | 2001-351642 A | 12/2001 | |
| WO | WO 01/06585 A1 | 1/2001 | |
| WO | WO 01/022513 A1 | 3/2001 | |

OTHER PUBLICATIONS

English Translation of Japanese Office Action for Appln. No. JP 2002-163733 issued Apr. 4, 2006.

Huang, R.F., et al.: *Wear-resistant multilayered diamond-like carbon coating prepared by pulse biased arc ion plating*, Diamond and Related Materials, Elsevier Science Publishers, Amsterdam, NL, vol. 10, No. 9-10, Sep. 2001, pp. 1850-1854.

Database Compensex [Online] Engineering Information, Inc., New York, NY, US; Stueber M., et al.: *Graded layer design for stress-reduced and strongly adherent superhard amorphous carbon films*, XP00243248, Database accession No. E2000054946265 *abstract* & Surf Coat Technol.; Surface And Coatings Technology 1999 Elsevier Sequoia SA, Lausanne, Switzerland, vol. 116, Sep. 14, 1998, pp. 591-598.

\* cited by examiner

VARIATION I

VARIATION II

VARIATION III

VARIATION IV

VARIATION IX

VARIATION X

VARIATION XI

VARIATION XII

FIG. 17
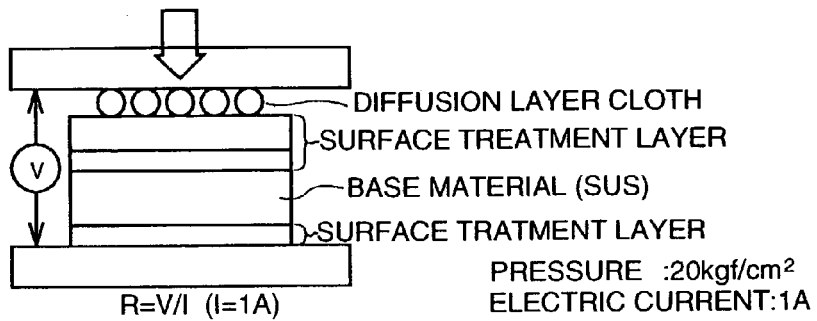
FIG. 18 VARIANCE OF CONTACT RESISTANCE
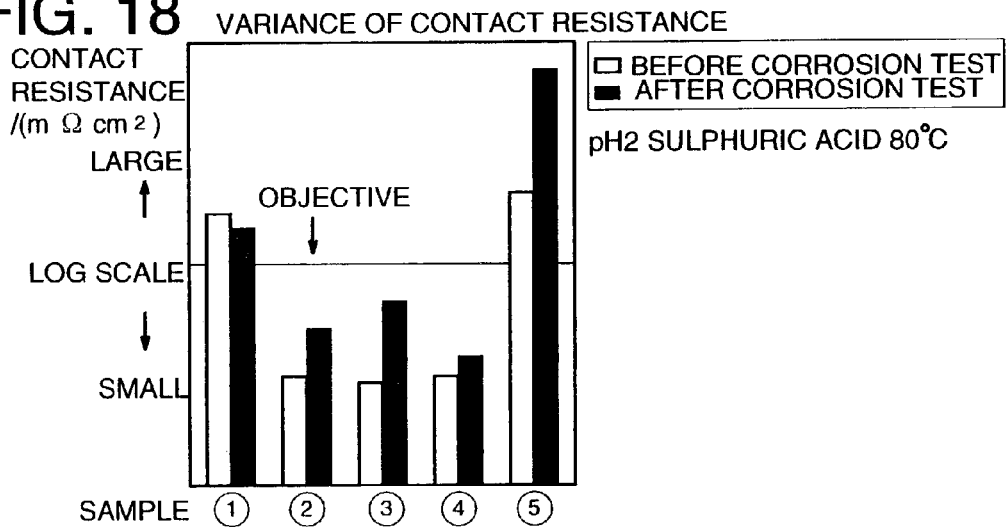
FIG. 19
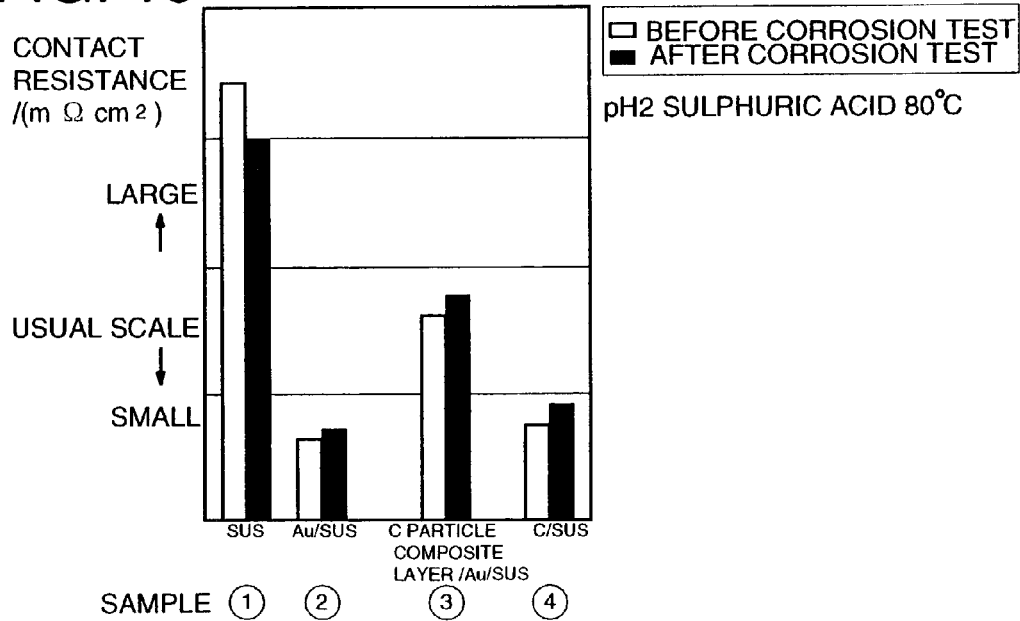

SEPARATOR OF A FUEL CELL AND A MANUFACTURING METHOD THEREOF

BACKGROUND OF THE INVENTION

1. Field of the Invention

The present invention relates to a separator for a fuel cell and a manufacturing method thereof, and more particularly, relates to a metal separator of PEFC (Polymer Electrolyte Fuel Cell) and a manufacturing method thereof.

2. Description of Related Art

A PEFC apparatus includes individual fuel cells. Each fuel cell includes a membrane-electrode assembly (MEA) and a separator. The MEA includes an electrolyte membrane and a pair of electrodes disposed on opposite sides of the electrolyte membrane. The pair of electrodes includes an anode provided on one side of the membrane and constructed of a first catalyst layer and cathode provided on the other side of the membrane and constructed of a second catalyst layer. A first diffusion layer may be provided between the first catalyst layer and a first separator and a second diffusion layer may be provided between the second catalyst layer and a second separator. The first separator has a passage formed therein for supplying fuel gas (hydrogen) to the anode and the second separator has a passage formed therein for supplying oxidant gas (oxygen, usually, air) to the cathode. The separator constructs a passage of electrons between adjacent fuel cells.

At least one layer of the fuel cell constructs a module. A number of modules are piled, and electrical terminals, electrical insulators, and end plates are disposed at opposite ends of the pile of modules. After tightening the pile of modules in a fuel cell stacking direction, the end plates are coupled to a fastening member (for example, a tension plate) extending in the fuel cell stacking direction outside the pile of modules by bolts extending perpendicularly to the fuel cell stacking direction, thereby constructing a stack of fuel cells.

In the PEFC, at the anode, hydrogen is changed to positively charged hydrogen ions (i.e., protons) and electrons. The hydrogen ions move through the electrolyte membrane to the cathode where the hydrogen ions react with oxygen supplied and electrons (which are generated at an anode of the adjacent MEA and move to the cathode of the instant MEA through a separator, or which are generated at an anode of one of the axially outmost fuel cells and move to the cathode of the other of the axially outmost fuel cell through an outside electrical circuit) to form water as follows:

At the anode: $H_2 \rightarrow 2H^+ + 2e^-$

At the cathode: $2H^+ + 2e^- + (\frac{1}{2})O_2 \rightarrow H_2O$

Since the separator is required to have an electrical conductivity, the separator is made from metal, carbon, electrically conductive synthetic resin, or combination of metal and synthetic resin.

The carbon separator and the electrically conductive synthetic resin separator are chemically stable even when exposed to acid water and maintains the electrical conductivity for a long period of time. However, since it has to have a relatively large thickness for ensuring a strength at a bottom of the reactant gas passage when the passage is formed in the separator, a length of the fuel cell stack is necessarily large.

In contrast, with the metal separator, since the metal separator has a relatively large strength and the thickness at the bottom of the reactant gas passage of the separator may be thin, a length of the fuel cell stack is relatively small. However, since the metal separator suffers corrosion when exposed to acid water for a long period of time, there arises the problems of a decrease in the electrical conductivity due to the corrosion and a decrease of the electrical output of the fuel cell. Therefore, to use the metal separator, the corrosion resistance and the electrical conductivity of the metal separator should be assured for a long period of time.

Japanese Patent Application 2000-67881 discloses a separator for a fuel cell where an amorphous carbon layer, which is excellent in electrical conductivity and corrosion resistance, is formed directly on a surface of a base material of the separator by ion beam vapor deposition method.

However, with the conventional metal separator, there is a problem that since the carbon layer is formed directly on the metal separator base material, bonding of the carbon layer with the metal separator base material (SUS) is insufficient. When an acid water invades between the carbon layer and the base material at carbon layer peeled portions, metal of the base metal is melted in the form of ions into the water to attack the membrane electrolyte to shorten the life of the fuel cell.

SUMMARY OF THE INVENTION

An object of the present invention is to provide a separator, a base material of which is metal, of a fuel cell and a manufacturing method thereof which can maintain a high electrical conductivity and an excellent corrosion resistance for a long period of time.

The above object can be performed by the following separator and manufacturing method according to the present invention:

(1) A separator of a fuel cell including:

a base material made of metal and a surface treatment layer formed on the base material, the surface treatment layer including:

a base material-side portion made from metal or semi-metal (Me), or carbide of the metal or semi-metal (MeC); and a base material opposite-side portion made from carbon (C) formed at an atom level, or composite materials of carbon and (a) the metal or semi-metal or (b) the carbide of the metal or semi-metal (C+Me or MeC) formed at an atom level.

(2) A separator according to above (1), wherein the surface treatment layer further includes a carbon particle composite layer formed on the base material opposite-side portion.

(3) A manufacturing method for a separator of a fuel cell including a base material made of metal and a surface treatment layer formed on the base material, the surface treatment layer including:

a base material-side portion made from metal or semi-metal (Me), or carbide of the metal or semi-metal (MeC); and a base material opposite-side portion made from carbon (C) formed at an atom level, or composite materials of carbon and (a) the metal or semi-metal or (b) the carbide of the metal or semi-metal (C+Me or MeC) formed at an atom level, the method including a step of forming the base material opposite-side portion by dry-coating including a physical vapor deposition.

(4) A method according to above (3), further including a step of forming a carbon particle composite layer on the base material opposite-side portion.

According to above (1), since the surface treatment layer includes a metal layer (the base material-side portion) between the carbon layer (the base material opposite-side portion) and the separator base material, a bond between the carbon layer and the separator base material is enhanced so that a corrosion resistance and a life of the fuel cell are improved. Further, since the carbon layer is formed at an atom level, defects are unlikely to be generated in the carbon layer so that a high electrical conductivity (a low electric resistance) and a high corrosion resistance are obtained.

According to above (2), since the carbon particle composite layer (for example, a carbon coating layer, thus, formed at a non-atom level) is formed on the base material opposite-side portion, the effect of the above (1) is obtained as it is. If as a surface treatment layer, a noble metal layer is formed on the base material and a carbon coating layer is formed on the noble metal layer, a low electric resistance, a high corrosion resistance and a long life will be obtained. The same effects as those of the surface treatment layer of the noble metal layer and the carbon coating layer can be obtained by the above (2), without using noble metal, that is, at a cheaper cost.

According to above (3) and (4), since at least the carbon layer is formed by dry coating, the carbon layer can be formed easily at an atom level.

BRIEF DESCRIPTION OF THE DRAWINGS

The above and other objects, features, and advantages of the present invention will become apparent and will be more readily appreciated from the following detailed description of the preferred embodiments of the present invention in conjunction with the accompanying drawings, in which:

FIG. 17 is a cross-sectional view of an apparatus for conducting contact resistance tests 1 and 2 for a separator according to the present invention and a comparison example.

FIG. 18 is a graph illustrating test results of the contact resistance test 1 for the separator according to the present invention and the comparison example.

FIG. 19 is a graph illustrating test results of the contact resistance test 2 for the separator according to the present invention and the comparison example.

DETAILED DESCRIPTION OF THE PREFERRED EMBODIMENTS

A separator of a fuel cell and a manufacturing method thereof according to the present invention will be explained with reference to FIGS. 1-19.

FIGS. 1-12 illustrate Embodiment 1 of the present invention. In Embodiment 1, the separator has a surface treatment layer including a carbon layer formed at an atom level.

Figure 13:
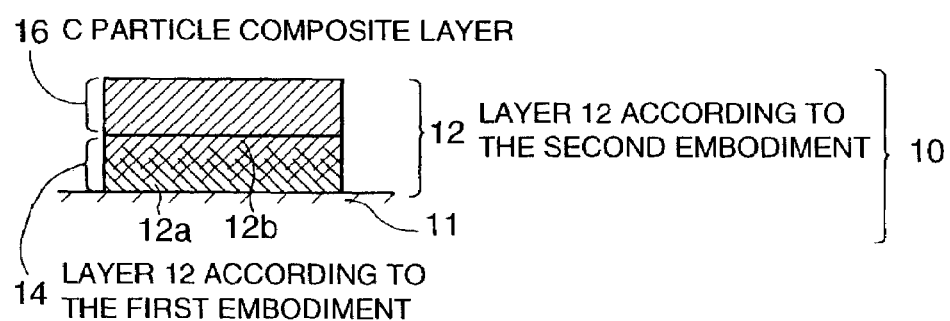
FIG. 13 is an enlarged cross-sectional view of one portion of a separator of a fuel cell according to a second embodiment of the present invention.

FIG. 13 illustrates Embodiment 2 of the present invention. In Embodiment 2, the separator has a surface treatment layer including a carbon particle composite layer further formed on the carbon layer of Embodiment 1.

FIGS. 1-12 illustrate a plurality of variations (Variations I-XII) of the surface treatment layer applicable to Embodiments 1 and 2.

Portions common or similar to all of the embodiments and variations of the present invention are denoted with the same reference numerals throughout all of the embodiments of the present invention.

First, those portions common or similar to all of the embodiments and variations will be explained with reference to FIG. 1.

A fuel cell into which a separator according to the present invention is piled is mounted to, for example, a vehicle. However, the fuel cell may be used for other than a vehicle. The fuel cell is of a polymer electrolyte fuel cell (PEFC). The PEFC may have the same stack structure as that of the conventional fuel cell explained in Related Art.

Figure 1:
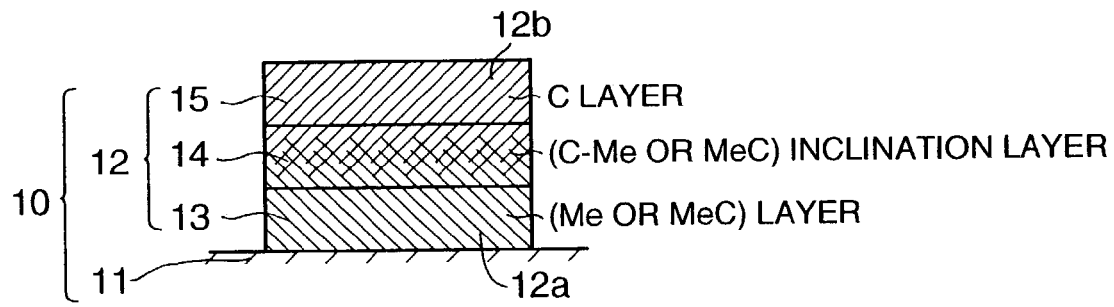
FIG. 1 is an enlarged, cross-sectional view of one portion of a separator of a fuel cell of Variation I according to a first embodiment and a second embodiment of the present invention.

The separator 10 of the fuel cell is a metal separator, and as illustrated in FIG. 1, has a separator base material 11 (hereinafter, base material) made of metal and a surface treatment layer 12 formed on a surface of the base material 11.

The surface treatment layer 12 includes:

a base material-side portion 12a (a portion close to the base material 11) made from metal or semi-metal (Me), or carbide of the metal or semi-metal (MeC); and a base material opposite-side portion 12b (a portion far from the base material 11) made from carbon (C) formed at an atom level, or composite materials of carbon and (a) the metal or semi-metal or (b) the carbide of the metal or semi-metal (C+Me or MeC) formed at an atom level.

The surface treatment surface 12 includes at least two of (a) metal or semi-metal, (b) carbide of the metal or semi-metal, and (c) carbon. The surface treatment surface 12 may have an inclination in a composition ratio between the base material-side portion 12a and the base material opposite-side portion 12b. In the case, the outside carbon layer may be the (C+Me or MeC).

The metal (Me) of the surface treatment surface 12 may be of the same kind as or that of the base material 11 or of a different kind from that of the base material 11.

Preferably, the metal or semi-metal (Me) has a corrosion resistance equal to or more than that of the base material 11 and has a chemical reactivity (a bond) with carbon.

The metal of the base material 11 includes stainless steel (SUS), steel, aluminum (Al), aluminum alloy, titanium (Ti), and titanium alloy.

The base material opposite-side portion 12b of the surface treatment layer 12, constructed of carbon (C) formed at an atom level, or composite materials of carbon and the metal or semi-metal or the carbide of the metal or semi-metal (C+Me or MeC) formed at an atom level is formed by a dry coating which includes any one of:

a) PVD (physical vapor deposition) including a vapor deposition, sputtering and ion plating (in the process, a gas such as HC as well as a solid target may be used for a carbon source), and b) CVD (chemical vapor deposition).

Carbon has a low electric resistance and a high corrosion resistance. The carbon (C) formed at an atom level or the composite materials of carbon and the metal or semi-metal or the carbide of the metal or semi-metal (C+Me or MeC) formed at an atom level has almost no defects (porosities).

The metal or semi-metal (Me) constructing the base material-side portion 12a includes: titanium (Ti), zirconium (Zr), hafnium (Hf) of Group 4A of periodic table; vanadium (V), niobium (Nb), tantalum (Ta) of Group 5A of periodic table; chromium (Cr), molybdenum (Mo), tungsten (W) of Group 6A of periodic table; silicon (Si) of Group 4B of periodic table; and boron (B) of Group 3B of periodic table.

The metal or semi-metal (Me) has a high carbide forming ability (a high affinity with carbon) and is a metal or semi-metal having a bond ability with carbon. The metal or semi-metal (Me) has a high acid resistance and a high corrosion resistance.

Because of metal or semi-metal, the metal or semi-metal (Me) can conduct metal-metal bonding. As a result, the bond strength of the metal or semi-metal (Me) layer with the base material 11 is increased and is unlikely to peel off, and micro-sized defects of an atom level is suppressed.

Preferably, the metal or semi-metal (Me) layer constructing the base material-side portion 12a is formed by a dry coating including PVD and CVD. However, the (Me) layer may be formed by a wet coating including an electrical plating other than vapor deposition.

FIGS. 1-12 illustrate various variations (Variations I-XII) which the surface treatment layer 12 can take and are applicable to each of Embodiments 1 and 2 of the present invention. The surface treatment layer 12 may take any structure of FIGS. 1-12. Each variation will be explained below.

[Variation I]

In Variation I, as illustrated in FIG. 1, the surface treatment layer 12 includes:

a (Me or MeC) layer 13 formed on the base material 11, made from the metal or semi-metal (Me) having a corrosion resistance or the carbide of the metal or semi-metal (MeC);

a (carbon–Me or MeC) inclination layer 14 formed on the (Me or MeC) layer 13, including the carbon (C), and the metal or semi-metal (Me), which may the same kind of metal as that of the layer 13 or may be a different kind of metal from that of the layer 13, or the carbide of the metal or semi-metal (MeC), where a composition ratio of the carbon (C) is increased in a direction away from the base material 11; and a carbon layer 15 formed at an atom level, formed on the (carbon–Me or MeC) inclination layer 14.

The base material-side portion 12a includes (is formed by) the (Me or MeC) layer 13, and the base material opposite-side portion 12b includes (is formed by) the carbon layer 15.

Effects obtained by Variation I are as follows:

(a) Since the carbon layer 15 is provided, a low electric resistance and a high corrosion resistance are obtained, so that a reliability of the separator is improved.

(b) Since the (carbon–Me or MeC) inclination layer 14 is provided, (b-1) due to the carbon-metal bonding, the (carbon–Me or MeC) inclination layer 14 is tight, so that a low electric resistance and a high corrosion resistance are obtained; and (b-2) due to the inclination of the composition ratio of carbon and metal or semi-metal, a stress in the (carbon–Me or MeC) inclination layer 14 is relieved, so that a bond strength between the (carbon–Me or MeC) inclination layer 14 and each of the carbon layer 15 and the (Me or MeC) layer 13 is increased, and as a result, a bond strength between the carbon layer 15 and the base material 11 also is increased.

(c) Since the (Me or MeC) layer 13 is provided, (c-1) due to the metal-metal bonding between the (Me or MeC) layer 13 and the (carbon–Me or MeC) inclination layer 14, and due to the metal-metal bonding between the (Me or MeC) layer 13 and the base material 11, bond strengths between the layers are increased, so that a structural reliability is increased; and (c-2) by using a metal more electric-chemically stable than the base material 11, for the (Me or MeC) layer 13, a high corrosion resistance is obtained.

[Variation II]

Figure 2:
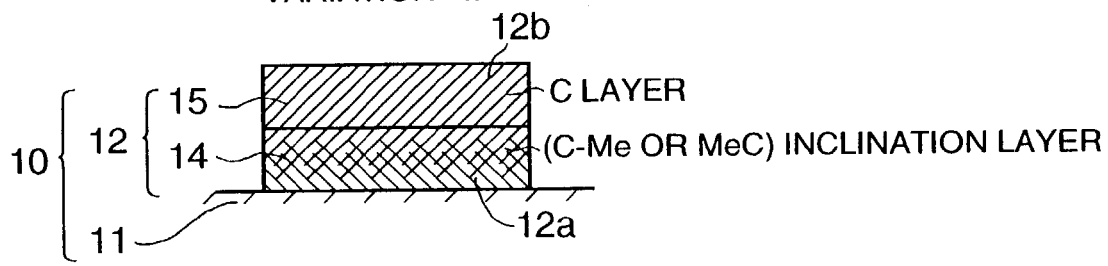
FIG. 2 is an enlarged, cross sectional view of one portion of a separator of a fuel cell of Variation II according to a first embodiment and a second embodiment of the present invention.

In Variation II, as illustrated in FIG. 2, the surface treatment layer 12 includes:

a (carbon–Me or MeC) inclination layer 14 formed on the base material 11, including the carbon (C), and the metal or semi-metal (Me) or the carbide of the metal or semi-metal (MeC), where a composition ratio of the carbon (C) is increased in a direction away from the base material 11; and a carbon layer 15 formed at an atom level, formed on the (carbon–Me or MeC) inclination layer 14.

The base material-side portion 12a includes a portion close to the base material 11, of the (carbon–Me or MeC) inclination layer 14, and the base material opposite-side portion 12b includes the carbon layer 15.

Effects obtained by Variation II are as follows:

(a) Since the carbon layer 15 is provided, a low electric resistance and a high corrosion resistance are obtained, so that a reliability of the separator is improved.

(b) Since the (carbon–Me or MeC) inclination layer 14 is provided, (b-1) due to the carbon-metal bonding, the (carbon–Me or MeC) inclination layer 14 is tight, so that a low electric resistance and a high corrosion resistance are obtained; and (b-2) due to the inclination of the composition ratio of carbon and metal or semi-metal, a stress in the (carbon–Me or MeC) inclination layer 14 is relieved, so that a bond strength between the (carbon–Me or MeC) inclination layer 14 and each of the carbon layer 15 and the base material 11 is increased, and as a result, a bond strength between the carbon layer 15 and the base material 11 also is increased.

[Variation III]

Figure 3:
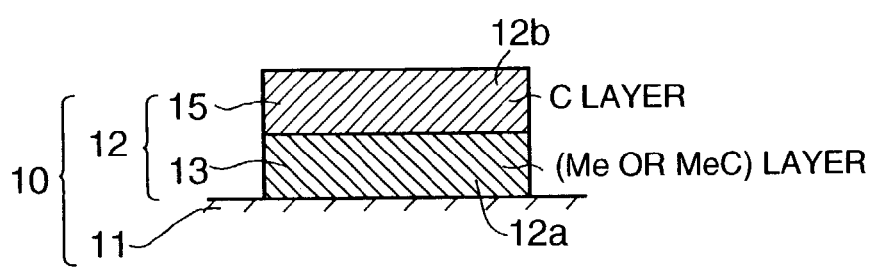
FIG. 3 is an enlarged, cross-sectional view of one portion of a separator of a fuel cell of Variation III according to a first embodiment and a second embodiment of the present invention.

In Variation III, as illustrated in FIG. 3, the surface treatment layer 12 includes:

a (Me or MeC) layer 13 formed on the base material 11, made from the metal or semi-metal (Me) having a corrosion resistance and a bond ability with carbon or the carbide of the metal or semi-metal (MeC); and a carbon layer 15 formed at an atom level, formed on the (Me or MeC) layer 13.

The base material-side portion 12a includes the (Me or MeC) layer 13, and the base material opposite-side portion 12b includes the carbon layer 15.

Effects obtained by Variation III are as follows:

(a) Since the carbon layer 15 is provided, a low electric resistance and a high corrosion resistance are obtained, so that a reliability of the separator is improved.

(b) Since the (Me or MeC) layer 13 is provided, (b-1) due to the metal-metal bonding between the (Me or MeC) layer 13 and the base material 11 and due to the carbon-metal bonding between the (Me or MeC) layer 13 and the carbon layer 15, bond strengths between the layers are increased, so that a structural reliability is increased; and (b-2) by using a metal more electric-chemically stable than the base material 11, for the (Me or MeC) layer 13, a high corrosion resistance is obtained.

[Variation IV]

Figure 4:
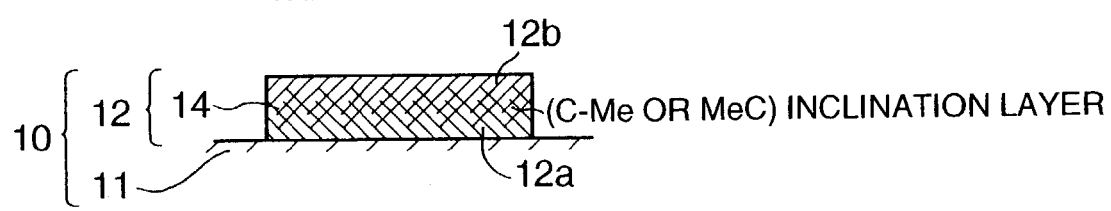
FIG. 4 is an enlarged, cross-sectional view of one portion of a separator of a fuel cell of Variation IV according to a first embodiment and a second embodiment of the present invention.

In Variation IV, as illustrated in FIG. 4, the surface treatment layer 12 includes a (carbon–Me or MeC) inclination layer 14 formed on the base material 11, including the carbon (C), and the metal or semi-metal (Me) or the carbide of the metal or semi-metal (MeC), where a composition ratio of the carbon (C) is increased in a direction away from the base material 11.

The base material-side portion 12a includes a portion close to the base material 11, of the (carbon–Me or MeC) inclination layer 14, and the base material opposite-side portion 12b includes a portion far from the base material 11, of the (carbon–Me or MeC) inclination layer 14.

Effects obtained by Variation IV are as follows:

(a) Since the (carbon–Me or MeC) inclination layer 14 is provided, (b-1) due to the carbon-metal bonding, the (carbon–Me or MeC) inclination layer 14 is tight, so that a low electric resistance and a high corrosion resistance are obtained; and due to the structure that the base material opposite-side portion 12b includes a portion far from the base material 11, of the (carbon–Me or MeC) inclination layer 14 and that the portion far from the base material 11 is almost a carbon layer, a low electric resistance and a high corrosion resistance are obtained, so that a reliability of the separator is improved; and (b-2) due to the inclination of the composition ratio of carbon and metal or semi-metal, a stress in the (carbon–Me or MeC) inclination layer 14 is relieved. Further, since a bond strength between layers in the (carbon–Me or MeC) inclination layer 14 is large and a bond strength between the base material-side portion 12a and the base material 11 is large, the outermost portion which is an almost carbon portion, of the (carbon–Me or MeC) inclination layer 14 strongly bonds to the base material 11. As a result, a high corrosion resistance and a long life are assured.

[Variation V]

Variations V-VIII are variations of intermediate layers 13 and 14 of Variations I-IV, where the metal or semi-metal (Me) are constructed of two or more metals or semi-metals, for example, Me(A) of tungsten and Me(B) of chromium. The layer may include a plurality kinds of metals or semi-metals where the composition ratio inclines, and may include one kind of metal or semi-metal.

Figure 5:
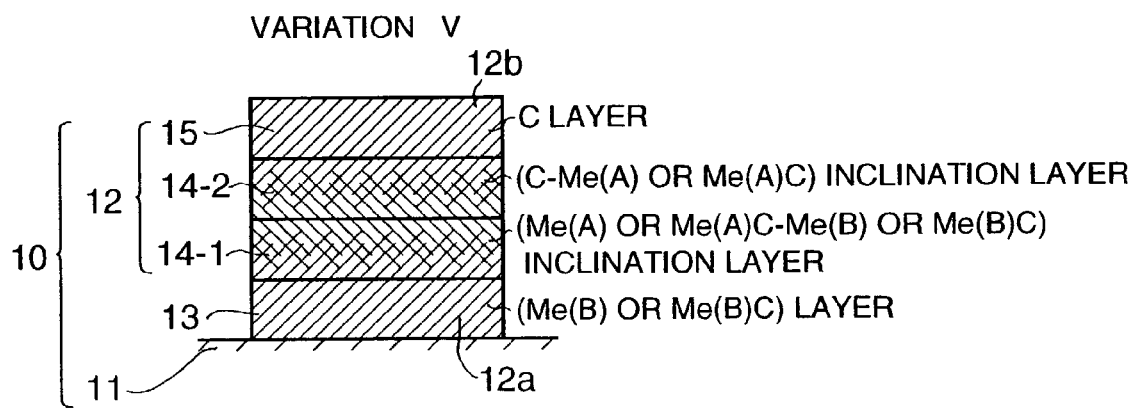
FIG. 5 is an enlarged, cross-sectional view of one portion of a separator of a fuel cell of Variation V according to a first embodiment and a second embodiment of the present invention.

More particularly, in Variation V, as illustrated in FIG. 5, the surface treatment layer 12 includes:

a (Me(B) or Me(B)C) layer 13 formed on the base material 11, made from the metal or semi-metal (Me(B)) of a kind (B) having a corrosion resistance or the carbide of the metal or semi-metal of the kind (B) (Me(B)C);

a (Me(A) or Me(A)C-Me(B) or Me(B)C) inclination layer 14-1 formed on the (Me(B) or Me(B)C) layer 13, including the metal or semi-metal (Me(A)) of another kind (A) or the carbide of the metal or semi-metal of the kind (A) (Me(A)C), and the metal or semi-metal (Me(B)) of the kind (B) or the carbide of the metal or semi-metal of the kind (B) (Me(B)C), where a composition ratio of the metal or semi-metal (Me(A)) of the kind (A) or the carbide of the metal or semi-metal of the second kind (A) (Me(A)C) is increased in a direction away from the base material 11;

a (carbon–Me(A) or Me(A)C) inclination layer 14-2 formed on the (Me(A) or Me(A)C-Me(B) or Me(B)C) inclination layer 14-1, including the carbon (C), and the metal or semi-metal (Me(A)) of the kind (A) or the carbide of the metal or semi-metal (Me(A)C) of the kind (A), where a composition ratio of the carbon (C) is increased in a direction away from the base material 11; and a carbon layer 15 formed at an atom level, formed on the (carbon–Me(A) or Me(A)C) inclination layer 14-2.

In a case where the metal or semi-metal includes two kinds (A) and (B), the inclination layer includes two layers 14-1 and 14-2, and in a case where the metal or semi-metal includes a plurality of kinds (A), (B) . . . and (N), the inclination layer includes a plurality of layers 14-1, 14-2, . . . and 14-N.

The base material-side portion 12a includes the (Me(B) or Me(B)C) layer 13, and the base material opposite-side portion 12b includes the carbon layer 15.

Effects obtained by Variation V are as follows:

(a) Since the carbon layer 15 is provided, a low electric resistance and a high corrosion resistance are obtained, so that a reliability of the separator is improved.

(b) Since the (Me(A) or Me(A)C-Me(B) or Me(B)C) inclination layer 14-1 and the (carbon–Me(A) or Me(A)C) inclination layer 14-2 are provided, (b-1) due to the metal-metal bonding and the carbon-metal bonding, the (Me(A) or Me(A)C-Me(B) or Me(B)C) inclination layer 14-1 and the (carbon–Me(A) or Me(A)C) inclination layer 14-2 are tight, so that a low electric resistance and a high corrosion resistance are obtained;

(b-2) due to the inclination of the composition ratio of carbon and metal or semi-metal (A) and the inclination of the composition ratio of metal or semi-metal (A) and metal or semi-metal (B), a stress in the (Me(A) or Me(A)C-Me(B) or Me(B)C) inclination layer 14-1 and a stress in the (carbon–Me(A) or Me(A)C) inclination layer 14-2 are relieved, so that a bond strength between the (carbon–Me(A) or Me(A)C) inclination layer 14-2 and the carbon layer 15 and a bond strength between the (carbon–Me(B) or Me(B)C) inclination layer 14-1 and the (Me(B) or Me(B)C) layer 13 are increased, and as a result, a bond strength between the carbon layer 15 and the (Me(B) or Me(B)C) layer 13 (thus, the base material 11) also is increased; and (b-3) due to the provision of two or more inclination layers 14-1 and 14-2, a stress in the surface treatment layer 12 is more relieved than in a case of a single inclination layer.

(c) Since the (Me(B) or Me(B)C) layer 13 is provided, (c-1) due to the metal-metal bonding between the (Me(B) or Me(B)C) layer 13 and the(Me(A) or Me(A)C-Me(B) or Me(B)C) inclination layer 14-1, and due to the metal-metal bonding between the (Me(B) or Me(B)C) layer 13 and the base material 11, bond strengths between the layers are increased, so that a structural reliability is increased; and (c-2) by using a metal more electric-chemically stable than the base material 11, for the (Me(B) or Me(B)C) layer 13, a high corrosion resistance is obtained.

[Variation VI]

Figure 6:
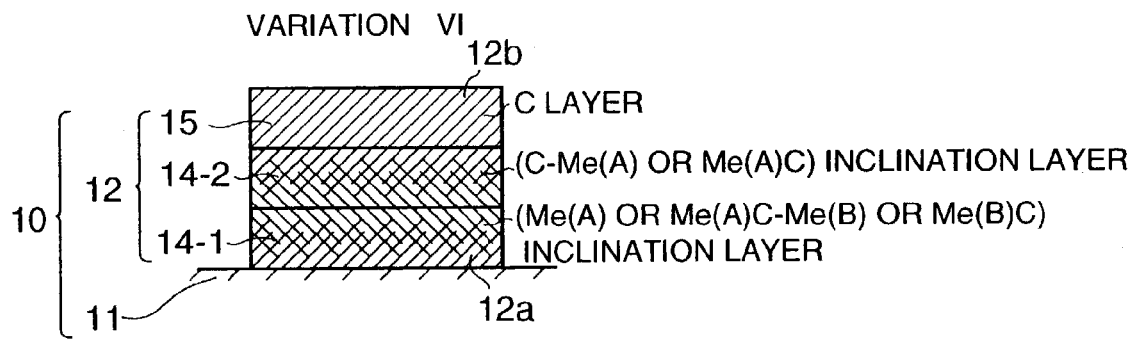
FIG. 6 is an enlarged, cross-sectional view of one portion of a separator of a fuel cell of Variation VI according to a first embodiment and a second embodiment of the present invention.

In Variation VI, as illustrated in FIG. 6, the surface treatment layer 12 includes:

a (Me(A) or Me(A)C-Me(B) or Me(B)C) inclination layer 14-1 formed on the base material 11, including the metal or semi-metal (Me(A)) of a kind (A) or the carbide of the metal or semi-metal of the kind (A) (Me(A)C), and the metal or semi-metal (Me(B)) of the kind (B) or the carbide of the metal or semi-metal of the kind (B) (Me(B)C), where a composition ratio of the metal or semi-metal (Me(A)) of the kind (A) or the carbide of the metal or semi-metal of the second kind (A)(Me(A)C) is increased in a direction away from the base material 11;

a (carbon–Me(A) or Me(A)C) inclination layer 14-2 formed on the (Me(A) or Me(A)C-Me(B) or Me(B)C) inclination layer 14-1, including the carbon (C), and the metal or semi-metal (Me(A)) of the kind (A) or the carbide of the metal or semi-metal (Me(A)C) of the kind (A), where a composition ratio of the carbon (C) is increased in a direction away from the base material 11; and a carbon layer 15 formed at an atom level, formed on the (carbon–Me(A) or Me(A)C) inclination layer 14-2.

The base material-side portion 12a includes a portion close to the base material 11 (that is, a ((Me(B) or (Me(B)C) portion), of the (Me(A) or Me(A)C-Me(B) or Me(B)C) inclination layer 14-1, and the base material opposite-side portion 12b includes the carbon layer 15.

Effects obtained by Variation VI are as follows:

(a) Since the carbon layer 15 is provided, a low electric resistance and a high corrosion resistance are obtained, so that a reliability of the separator is improved.

(b) Since the (Me(A) or Me(A)C-Me(B) or Me(B)C) inclination layer 14-1 and the (carbon–Me(A) or Me(A)C) inclination layer 14-2 are provided, (b-1) due to the metal-metal bonding and the carbon-metal bonding, the (Me(A) or Me(A)C-Me(B) or Me(B)C) inclination layer 14-1 and the (carbon–Me(A) or Me(A)C) inclination layer 14-2 are tight, so that a low electric resistance and a high corrosion resistance are obtained;

(b-2) due to the inclination of the composition ratio of carbon and metal or semi-metal (A) and the inclination of the composition ratio of metal or semi-metal (A) and metal or semi-metal (B), a stress in the (Me(A) or Me(A)C-Me(B) or Me(B)C) inclination layer 14-1 and a stress in the (carbon–Me(A) or Me(A)C) inclination layer 14-2 are relieved, so that a bond strength between the (carbon–Me(A) or Me(A)C) inclination layer 14-2 and the carbon layer 15 and a bond strength between the (carbon–Me(B) or Me(B)C) inclination layer 14-1 and the base material 11 are increased, and as a result, a bond strength between the carbon layer 15 and the base material 11 also is increased; and (b-3) due to the provision of two or more inclination layers 14-1 and 14-2, a stress in the surface treatment layer 12 is more relieved than in a case of a single inclination layer.

[Variation VII]

Figure 7:
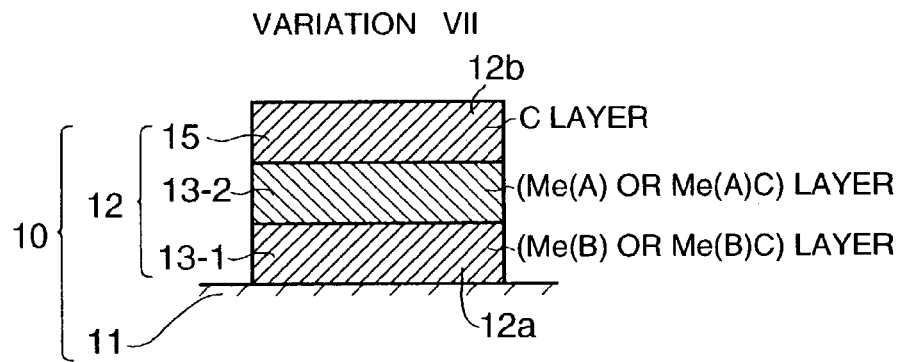
FIG. 7 is an enlarged, cross-sectional view of one portion of a separator of a fuel cell of Variation VII according to a first embodiment and a second embodiment of the present invention.

In Variation VII, as illustrated in FIG. 7, the surface treatment layer 12 includes:

a (Me(B) or Me(B)C) layer 13-1 formed on the base material 11, made from the metal or semi-metal (Me(B)) of a kind (B) having a corrosion resistance or the carbide of the metal or semi-metal of the kind (B)(Me(B)C);

a (Me(A) or Me(A)C) layer 13-2 formed on the (Me(B) or Me(B)C) layer 13-1, made from the metal or semi-metal (Me(A)) of a kind (A) having a bonding ability with carbon or the carbide of the metal or semi-metal of the kind (A) (Me(A)C); and a carbon layer 15 formed at an atom level, formed on the (Me(A) or Me(A)C) layer 13-2.

The base material-side portion 12a includes the (Me(B) or Me(B)C) layer 13-1, and the base material opposite-side portion 12b includes the carbon layer 15.

Effects obtained by Variation VII are as follows:

(a) Since the carbon layer 15 is provided, a low electric resistance and a high corrosion resistance are obtained, so that a reliability of the separator is improved.

(b) Since the (Me(B) or Me(B)C) layer 13-1 and (Me(A) or Me(A)C) layer 13-2 are provided, (b-1) due to the metal-metal bonding between the (Me(B) or Me(B)C) layer 13-1 and the base material 11 and due to the carbon-metal bonding between the (Me(A) or Me(A)C)

layer 13-2 and the carbon layer 15, bond strengths between the layers are increased, so that a structural reliability is increased;

(b-2) by using a metal more electric-chemically stable than the base material 11, for the (Me(B) or Me(B)C) layer 13-1, a high corrosion resistance is obtained; and (b-3) due to the provision of the two layers 13-1 and 13-2, a stress in the surface treatment layer 12 is relieved more than that in a case of a single layer.

[Variation VIII]

Figure 8:
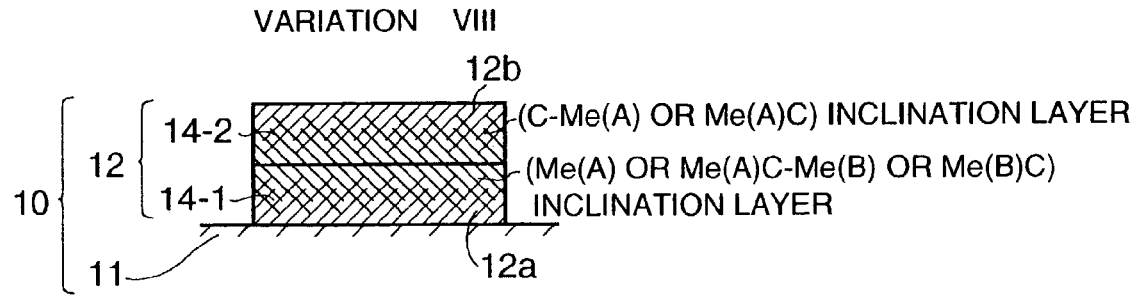
FIG. 8 is an enlarged, cross-sectional view of one portion of a separator of a fuel cell of Variation VIII according to a first embodiment and a second embodiment of the present invention.

In Variation VIII, as illustrated in FIG. 8, the surface treatment layer 12 includes:

a (Me(A) or Me(A)C-Me(B) or Me(B)C) inclination layer 14-1 formed on the base material 11, including the metal or semi-metal (Me(A)) of a kind (A) or the carbide of the metal or semi-metal of the kind (A)(Me(A)C), and the metal or semi-metal (Me(B)) of the kind (B) or the carbide of the metal or semi-metal of the kind (B) (Me(B)C), where a composition ratio of the metal or semi-metal (Me(A)) of the kind (A) or the carbide of the metal or semi-metal of the second kind (A)(Me(A)C) is increased in a direction away from the base material 11; and a (carbon–Me(A) or Me(A)C) inclination layer 14-2 formed on the (Me(A) or Me(A)C-Me(B) or Me(B)C) inclination layer 14-1, including the carbon (C), and the metal or semi-metal (Me(A)) of the kind (A) or the carbide of the metal or semi-metal (Me(A)C) of the kind (A), where a composition ratio of the carbon (C) is increased in a direction away from the base material 11.

The base material-side portion 12a includes a portion close to the base material 11 (that is, a ((Me(B) or (Me(B)C) portion), of the (Me(A) or Me(A)C-Me(B) or Me(B)C) inclination layer 14-1, and the base material opposite-side portion 12b includes a portion far from the base material 11 (that is, a carbon portion), of the (carbon–Me(A) or Me(A) C) inclination layer 14-2.

Effects obtained by Variation VIII are as follows:

(a) Since the (Me(A) or Me(A)C-Me(B) or Me(B)C) inclination layer 14-1 and the (carbon–Me(A) or Me(A)C) inclination layer 14-2 are provided, (a-1) due to the carbon-metal bonding, the (carbon–Me (A) or Me(A)C) inclination layer 14-2 is tight, so that a low electric resistance and a high corrosion resistance are obtained; and since the base material opposite-side portion 12b includes a portion far from the base material 11 (that is, an almost carbon portion), of the (carbon–Me(A) or Me(A)C) inclination layer 14-2, effects similar to those of the carbon layer 15, that is, a low electric resistance and a high corrosion resistance are obtained; and (a-2) due to the inclination of the composition ratio of carbon and metal or semi-metal (A) and the inclination of the composition ratio of metal or semi-metal (A) and metal or semi-metal (B), a stress in the (Me(A) or Me(A)C-Me(B) or Me(B)C) inclination layer 14-1 and a stress in the (carbon–Me(A) or Me(A)C) inclination layer 14-2 are relieved, so that a bond strength between the (carbon–Me(A) or Me(A)C) inclination layer 14-2 and the carbon layer 15 and a bond strength between the (carbon–Me(B) or Me(B) C) inclination layer 14-1 and the base material 11 are increased, and as a result, a bond strength between the carbon layer 15 and the base material 11 also is increased; and (a-3) due to the provision of two or more inclination layers 14-1 and 14-2, a stress in the surface treatment layer 12 is more relieved than in a case of a single inclination layer.

[Variation IX]

Variation IX-XII are cases where the outermost portion of the surface treatment layer 12 includes composite materials (carbon+Me or MeC) of carbon (C) and metal or semi-metal (Me) or a carbide of the metal or semi-metal (MeC), formed at an atom level.

Figure 9:
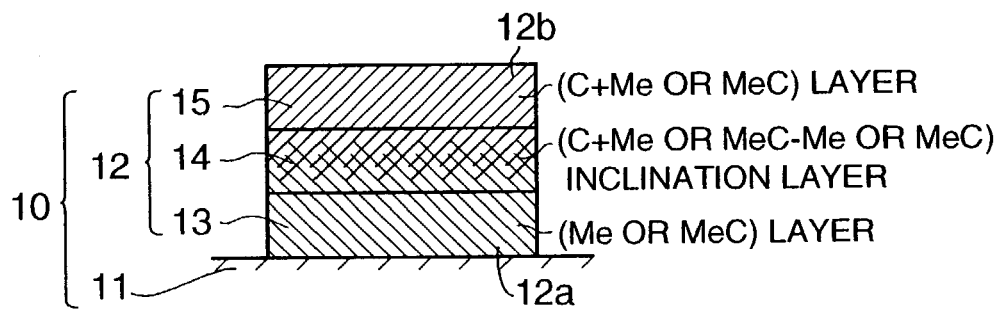
FIG. 9 is an enlarged, cross-sectional view of one portion of a separator of a fuel cell of Variation IX according to a first embodiment and a second embodiment of the present invention.

In Variation IX, as illustrated in FIG. 9, the surface treatment layer 12 includes:

a (Me or MeC) layer 13 formed on the base material 11, made from the metal or semi-metal (Me) having a corrosion resistance or the carbide of the metal or semi-metal (MeC);

a ((carbon+Me or MeC)-Me or MeC) inclination layer 14 formed on the (Me or MeC) layer 13, including composite materials formed at an atom level, of said carbon (C) and the metal or semi-metal (Me) or the carbide of the metal or semi-metal (MeC) (carbon+Me or MeC), and the metal or semi-metal (Me) or the carbide of said metal or semi-metal (MeC), where a composition ratio of the composite materials (carbon+Me or MeC) is increased in a direction away from the base material 11; and a (carbon+Me or MeC) layer 15 formed on the ((carbon+Me or MeC)-Me or MeC) inclination layer 14, formed in composite materials at an atom level, of the carbon (C) and the metal or semi-metal (Me) or the carbide of the metal or semi-metal (MeC).

The base material-side portion 12a includes the (Me or MeC) layer 13, and the base material opposite-side portion 12b includes the (carbon+Me or MeC) layer 15.

Effects obtained by Variation IX are as follows:

(a) Since the (carbon+Me or MeC) layer 15 is formed in composite materials, the (carbon+Me or MeC) layer 15 is tight, so that a low electric resistance and a high corrosion resistance are obtained, and as a result, a reliability of the separator is improved.

(b) Since the ((carbon+Me or MeC)-Me or MeC) inclination layer 14 is provided, (b-1) due to the composite material structure, the ((carbon+Me or MeC)-Me or MeC) inclination layer 14 is tight, so that a low electric resistance and a high corrosion resistance are obtained; and (b-2) due to the inclination of the composition ratio, a stress in the ((carbon+Me or MeC)-Me or MeC) inclination layer 14 is relieved, so that a bond strength between the ((carbon+Me or MeC)-Me or MeC) inclination layer 14 and each of the (carbon+Me or MeC) layer 15 and the (Me or MeC) layer 13 is increased, and as a result, a bond strength between the (carbon+Me or MeC) layer 15 and the base material 11 also is increased.

(c) Since the (Me or MeC) layer 13 is provided, (c-1) due to the metal-metal bonding between the (Me or MeC) layer 13 and the ((carbon+Me or MeC)-Me or MeC) inclination layer 14, and due to the metal-metal bonding between the (Me or MeC) layer 13 and the base material 11, bond strengths between the layers are increased, so that a structural reliability is increased; and (c-2) by using a metal more electric-chemically stable than the base material 11, for the (Me or MeC) layer 13, a high corrosion resistance is obtained.

[Variation X]

Figure 10:
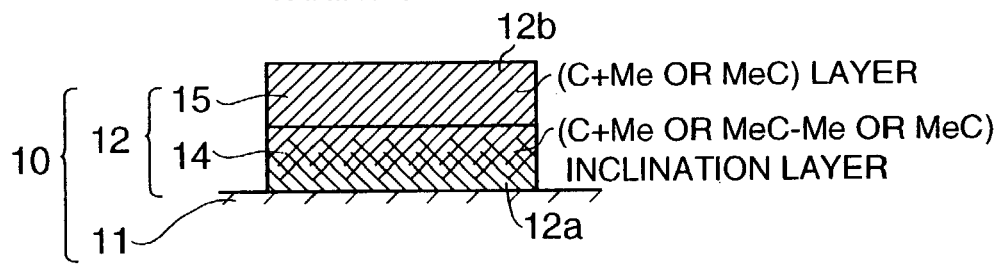
FIG. 10 is an enlarged, cross-sectional view of one portion of a separator of a fuel cell of Variation X according to a first embodiment and a second embodiment of the present invention.

In Variation X, as illustrated in FIG. 10, the surface treatment layer 12 includes:

a ((carbon+Me or MeC)-Me or MeC) inclination layer 14 formed on the base material 11, including composite materials formed at an atom level, of said carbon (C) and the metal or semi-metal (Me) or the carbide of the metal or semi-metal (MeC) (carbon+Me or MeC), and the metal or semi-metal (Me) or the carbide of said metal or semi-metal (MeC), where a composition ratio of the composite materials (carbon+Me or MeC) is increased in a direction away from the base material 11; and a (carbon+Me or MeC) layer 15 formed on the ((carbon+Me or MeC)-Me or MeC) inclination layer 14, formed in composite materials at an atom level, of the carbon (C) and the metal or semi-metal (Me) or the carbide of the metal or semi-metal (MeC).

The base material-side portion 12a includes a portion close to the base material 11, that is, the almost (Me or MeC) portion, of the ((carbon+Me or MeC)-Me or MeC) inclination layer 14, and the base material opposite-side portion 12b includes the (carbon+Me or MeC) layer 15.

Effects obtained by Variation X are as follows:

(a) Since the (carbon+Me or MeC) layer 15 is formed in composite materials, the (carbon+Me or MeC) layer 15 is tight, so that a low electric resistance and a high corrosion resistance are obtained, and as a result, a reliability of the separator is improved.

(b) Since the ((carbon+Me or MeC)-Me or MeC) inclination layer 14 is provided, (b-1) due to the composite material structure, the ((carbon+Me or MeC)-Me or MeC) inclination layer 14 is tight, so that a low electric resistance and a high corrosion resistance are obtained; and (b-2) due to the inclination of the composition ratio, a stress in the ((carbon+Me or MeC)-Me or MeC) inclination layer 14 is relieved, so that a bond strength between the ((carbon+Me or MeC)-Me or MeC) inclination layer 14 and each of the (carbon+Me or MeC) layer 15 and the (Me or MeC) layer 13 is increased, and as a result, a bond strength between the (carbon+Me or MeC) layer 15 and the base material 11 also is increased.

[Variation XI]

Figure 11:
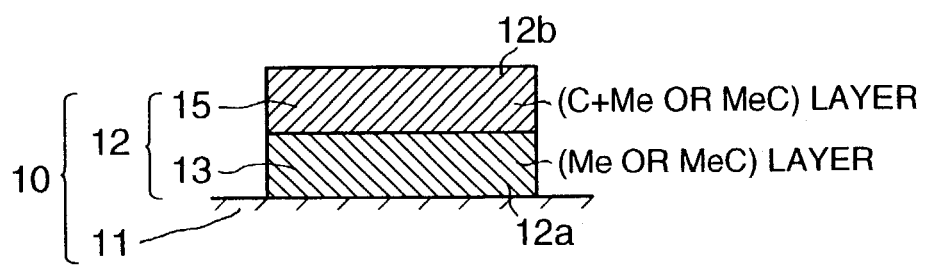
FIG. 11 is an enlarged, cross-sectional view of one portion of a separator of a fuel cell of Variation XI according to a first embodiment and a second embodiment of the present invention.

In Variation XI, as illustrated in FIG. 11, the surface treatment layer 12 includes:

a (Me or MeC) layer 13 formed on the base material 11, made from the metal or semi-metal (Me) having a corrosion resistance and a bond ability with carbon or the carbide of the metal or semi-metal (MeC); and a (carbon+Me or MeC) layer 15 formed on the (Me or MeC) layer 13, formed in composite materials at an atom level, of the carbon (C) and the metal or semi-metal (Me) or the carbide of the metal or semi-metal (MeC).

The base material-side portion 12a includes the (Me or MeC) layer 13, and the base material opposite-side portion 12b includes the (carbon+Me or MeC) layer 15.

Effects obtained by Variation XI are as follows:

(a) Since the (carbon+Me or MeC) layer 15 is formed in composite materials, the (carbon+Me or MeC) layer 15 is tight, so that a low electric resistance and a high corrosion resistance are obtained, and as a result, a reliability of the separator is improved.

(b) Since the (Me or MeC) layer 13 is provided, (b-1) due to the metal-metal bonding between the (Me or MeC) layer 13 and the base material 11 and due to the carbon-metal bonding between the (Me or MeC) layer 13 and the (carbon+Me or MeC) layer 15, bond strengths between the layers are increased, so that a structural reliability is increased; and (b-2) by using a metal more electric-chemically stable than the base material 11, for the (Me or MeC) layer 13, a high corrosion resistance is obtained.

[Variation XII]

Figure 12:
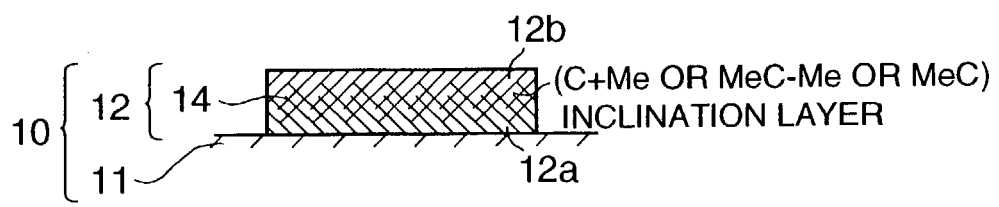
FIG. 12 is an enlarged, cross-sectional view of one portion of a separator of a fuel cell of Variation XII according to a first embodiment and a second embodiment of the present invention.

In Variation XII, as illustrated in FIG. 12, the surface treatment layer 12 includes:

a ((carbon+Me or MeC)-Me or MeC) inclination layer 14 formed on the base material 11, including composite materials formed at an atom level, of said carbon (C) and the metal or semi-metal (Me) or the carbide of the metal or semi-metal (MeC) (carbon+Me or MeC), and the metal or semi-metal (Me) or the carbide of said metal or semi-metal (MeC), where a composition ratio of the composite materials (carbon+Me or MeC) is increased in a direction away from the base material 11.

The base material-side portion 12a includes a portion close to the base material 11, that is, the almost (Me or MeC) portion, of the ((carbon+Me or MeC)-Me or MeC) inclination layer 14, and the base material opposite-side portion 12b includes a portion far from the base material 11, that is, the almost (carbon+Me or MeC) portion, of the ((carbon+Me or MeC)-Me or MeC) inclination layer 14.

Effects obtained by Variation XII are as follows:

(a) Since the ((carbon+Me or MeC)-Me or MeC) inclination layer 14 is provided, (b-1) due to the composite material structure, the ((carbon+Me or MeC)-Me or MeC) inclination layer 14 is tight, so that a low electric resistance and a high corrosion resistance are obtained; and (b-2) due to the inclination of the composition ratio, a stress in the ((carbon+Me or MeC)-Me or MeC) inclination layer 14 is relieved, so that a bond strength between the ((carbon+Me or MeC)-Me or MeC) inclination layer 14 and the (Me or MeC) layer 13 is increased, and as a result, a bond strength between the (carbon+Me or MeC) portion of the ((carbon+Me or MeC)-Me or MeC) inclination layer 14 and the base material 11 also is increased.

Next, portions unique to each embodiment of the present invention will be explained.

As illustrated in FIGS. 1-12, a separator 10 of a fuel cell according to a first embodiment of the present invention includes the base material 11 of the metal separator and the surface treatment layer 12 formed on the base material 11. The surface treatment layer 12 includes an outside surface portion, formed at an atom level by dry coating, which may be any one of the carbon layer 15, the base material opposite-side portion 12b made from almost carbon (C), of the (carbon–Me or MeC) inclination layer 14, and the (carbon+Me or MeC) layer 15. The carbon layer may be made by sputtering. The carbon layer formed at an atom level has a thickness of, for example, 0.01-10 μm, but not limited to the thickness.

A method of manufacturing the separator 10 according to the first embodiment of the present invention includes a step of forming at least the base material opposite-side portion 12b (the carbon layer formed at an atom level) by dry coating.

The dry coating may be any of PVD, CVD and combination of PVD and CVD. The PVD may be vapor deposition, sputtering, or ion plating. When the surface treatment layer 12 includes the metal layer 13 and/or carbon-metal inclination layer 14, the metal layer 13 and/or carbon-metal inclination layer 14 also may be formed by dry coating.

The effects of the separator and the manufacturing method thereof according to the first embodiment of the present invention are the same as described in the explanation about the common structures and methods.

As illustrated in FIG. 13, a separator of a fuel cell according to a second embodiment of the present invention includes the base material 11 of the metal separator and the surface treatment layer 12 formed on the base material 11. The surface treatment layer 12 further includes a carbon particle composite layer 16 formed on the base material opposite-side portion 12b (the carbon layer 15 formed at an atom level) of the surface treatment layer 12 according to the first embodiment of the present invention. A portion except the composite layer 16, of the surface treatment layer 12 according to the second embodiment of the present invention has the same structures and effects as those of the surface treatment layer 12 according to the first embodiment of the present invention.

The carbon particle composite layer 16 is formed by a wet coating method such as, for example, a spin coating method and a dipping method and is different from the layer formed at an atom level by dry coating. The carbon particle composite layer 16 formed by the wet coating includes, for example, a layer made of composite materials of graphite particles and a binder.

A manufacturing method of the separator 10 of a fuel cell according to the second embodiment of the present invention includes steps of (a) forming at least the carbon layer 15 (according to the method of the first embodiment of the present invention) by the dry coating, and (b) further forming the carbon particle composite layer 16 by the wet coating method.

With effects of the manufacturing method of the separator 10 according to the second embodiment of the present invention, since the method includes the first step which is the same as that of the manufacturing method of the separator according to the first embodiment of the present invention, the same effects as those of the first embodiment of the present invention are obtained as well. Further, according to the second embodiment, effects (including a low electric resistance, a high corrosion resistance, and a long life) equivalent to those of a comparison example where a surface treatment layer is formed by forming a noble metal (for example, Au or Ag) layer by sputtering and then forming a carbon coating layer on the noble metal layer by wet coating are obtained without using the noble metal, that is, at a relatively low cost. The comparison example includes a surface treatment layer obtained by replacing the layer 12 of FIG. 13 by a noble metal layer. The present invention does not include the comparison example.

Next, various tests about a corrosion resistance and an electrical conductivity of the separators according to the present invention and the comparison example were conducted and the results were compared with each other. The test results showed that the separator of the fuel cell according to the present invention have a sufficient corrosion resistance and a low electrical contact resistance. The tests and the results thereof will be explained below in more detail.

[Corrosion Resistance Test-1]

A corrosion resistance test was conducted by a method (hereinafter, a couple current test method) shown in FIG. 14.

A sample and an opposing electrode (made from burn-formed carbon with which the separator contacts in the fuel cell: graphite) were dipped in the acid aqueous solution simulating the environment (to which the separator is exposed in the fuel cell). The temperature was held at 80° C. The electric current density which the separator metal generated when dissolved in the form of an ion into the solution was measured by an ammeter disposed in an external circuit connecting the sample and the electrode. The corrosion period of time was 100 hours. A positive electric current, which was a current generated when Me was dissolved in the form of a positive ion, meant that the corrosion occurred, and a zero or negative current meant that there was no problem from the viewpoint of corrosion.

1. Test piece

The following test pieces (samples) were prepared:
 ① No treatment/SUS 316L—The base material was SUS 316L, and no surface treatment layer was formed.
 ② C/CrC/Cr(three layers)/SUS 316L—The base material was SUS 316L, and a surface treatment layer of C/CrC/Cr(three layers) was formed. This sample belonged to the present invention and was of Variation I-type. The thicknesses of the C, CrC, and Cr layers are 50 nm, 50 nm, and 75 nm, respectively.
 ③ C(single layer)/SUS 316L—The base material was SUS 316L, and a surface treatment layer of C (single layer) by sputtering was formed. This sample corresponded to Japanese Patent Publication 2000-67881 discussed in Related Art and was not included in the present invention.
 ④ CrC(single layer)/SUS 316L—This sample belonged to the present invention and was of Variation IV-type.
 ⑤ Cr(single layer)/SUS 316L—This sample had no C layer and was not included within the present invention.

2. Test conditions

Corrosion condition: sulfuric acid solution of pH 2, 80° C.
 Corrosion time period: 100 hours
 Opposing electrode material: burn-formed carbon (graphite)

3. Test results

Figure 15:
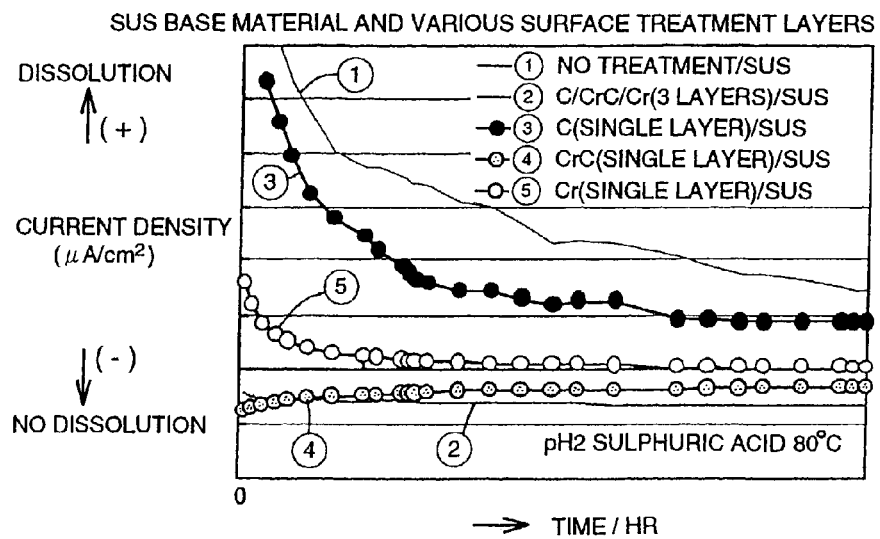
FIG. 15 is a graph illustrating test results of the corrosion resistance test 1 for the separator according to the present invention and the comparison example.

FIG. 15 shows the test results. The following test results were obtained:
 a) The C/CrC/Cr(three layers)/SUS 316L (Sample ②) and the CrC(single layer)/SUS 316L (Sample ④) only showed the corrosion resistance required (a negative current density in the couple current test).
 b) The C(single layer)/SUS 316L (Sample ③) could not show the corrosion resistance required because bond between the base material and the surface treatment layer was not sufficient and the sample was not included within the present invention. Similarly, a single metal layer formed on the base material (Sample ⑤) could not show the corrosion resistance required and was not included within the present invention.
 c) As an under-layer of the carbon layer, the carbon/metal inclination layer and metal layer (Sample ②) and the carbon/metal inclination layer (Sample ④) were effective for corrosion resistance.

[Corrosion Resistance Test-2]

Figure 14:
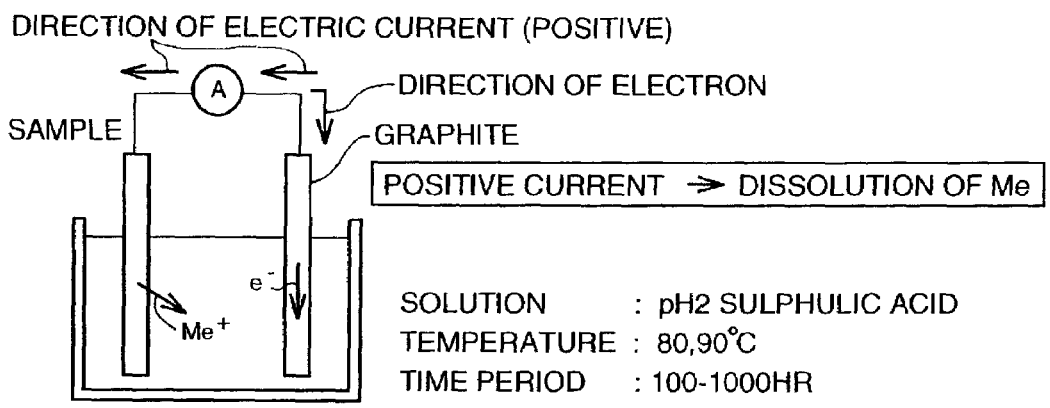
FIG. 14 is a cross-sectional view of an apparatus for conducting corrosion resistance tests 1 and 2 for a separator according to the present invention and a comparison example.

A corrosion resistance test was conducted by a couple current test method) shown in FIG. 14. The samples included test pieces according to the first embodiment of the present invention and a comparison example where an Au layer was formed on a base material and a carbon coating layer was further formed on the Au layer. The corrosion resistance test was conducted.

1. Test piece
   The following test pieces (samples) were prepared:
   ① No treatment/SUS 316L—The base material was SUS 316L, and no surface treatment layer was formed.
   ② 10 nm Au sputter(single layer)/SUS 316L—The base material was SUS 316L, and a surface treatment layer of 10 nm Au single layer formed by sputtering. This sample was a comparison example.
   ③ 40 nm C/10 nm Au sputter/SUS 316L—The base material was SUS 316L, and a surface treatment layer including two layers of 10 nm Au layer formed by sputtering and C particle composite layer formed on the 10 nm Au layer. This sample was a comparison example.
   ④ C/CrC/Cr(three layers)/SUS 316L—The base material was SUS 316L, and a surface treatment layer of C/CrC/Cr(three layers) was formed. This sample belonged to the present invention and was of Variation I-type. The thicknesses of the C, CrC, and Cr layers are 50 nm, 50 nm, and 75 nm, respectively.

2. Test conditions
   Corrosion condition: sulfuric acid solution of pH 2, 80° C.
   Corrosion time period: 100 hours
   Opposing electrode material: burn-formed carbon (graphite)

Figure 16:
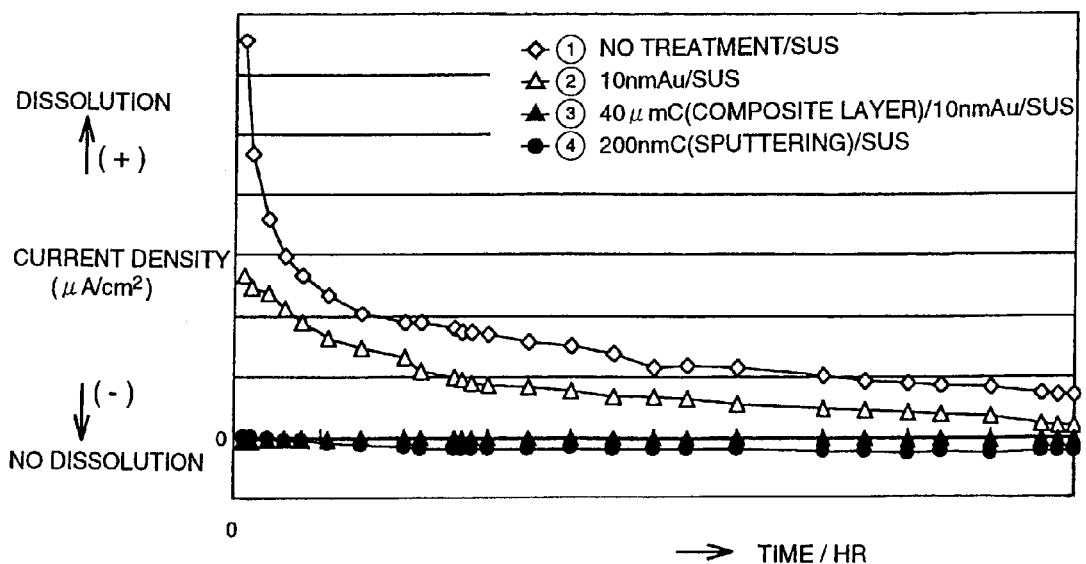
FIG. 16 is a graph illustrating test results of the corrosion resistance test 2 for the separator according to the present invention and the comparison example.

3. Test results
   FIG. 16 shows the test results. The following test results were obtained:
   a) From comparison between the 10 nm Au sputter(single layer)/SUS 316L (Sample ②) and the 40 nm C/10 nm Au sputter/SUS 316L (Sample ③), it would be understood that the C particle composite layer had a metal dissolution suppression effect (corrosion resistance effect).
   b) From comparison between the C/CrC/Cr(three layers)/SUS 316L (Sample ④) and the 40 nm C/10 nm Au sputter/SUS 316L (Sample ③), it would be understood that the test piece of Variation I-type had a metal dissolution suppression effect (corrosion resistance effect) equal to or more excellent than that of Sample ③.
   c) Since the carbon particle composite layer had a metal dissolution suppression effect as would be understood from a), the separator according to the second embodiment of the present invention had a metal dissolution suppression effect equal to or more excellent than that of the separator according to the first embodiment of the present invention.

[Contact Resistance Test-1]
A corrosion resistance test illustrated in FIG. 14 was conducted. A contact resistance of each test piece was measured before and after the contact resistance test illustrated in FIG. 17. In the measurement of the contact resistance, a pressure loaded on a test piece was set at 20 kgf/cm² substantially equal to an actual pressure of a fuel cell, and an electric current was set at 1A. An electric voltage V between opposite electrodes was measured, and a contact resistance R was calculated using the following equation:

$$R=V/I, \text{ where, } I=1A$$

1. Test piece (the same test pieces as those of CORROSION RESISTANCE TEST-1)
   The following test pieces (samples) were prepared:
   ① No treatment/SUS 316L—The base material was SUS 316L, and no surface treatment layer was formed.
   ② C/CrC/Cr(three layers)/SUS 316L—The base material was SUS 316L, and a surface treatment layer of C/CrC/Cr(three layers) was formed. This sample belonged to the present invention and was of Variation I-type. The thicknesses of the C, CrC, and Cr layers are 50 nm, 50 nm, and 75 nm, respectively.
   ③ C(single layer)/SUS 316L—The base material was SUS 316L, and a surface treatment layer of C (single layer) by sputtering was formed. This sample corresponded to Japanese Patent Publication 2000-67881 discussed in Related Art and was not included in the present invention.
   ④ CrC(single layer)/SUS 316L—This sample belonged to the present invention and was of Variation IV-type.
   ⑤ Cr(single layer)/SUS 316L—This sample had no C layer and was not included within the present invention.

2. Test conditions
   Corrosion condition: sulfuric acid solution of pH 2, 80° C.
   Corrosion time period: 100 hours
   Opposing electrode material: burn-formed carbon (graphite)

3. Test results
   An electric current was measured before and after the corrosion test. The test results are shown in FIG. 18. The following test results were obtained:
   a) The C/CrC/Cr(three layers)/SUS 316L (Sample ②), the CrC(single layer)/SUS 316L (Sample ④) and the C(single layer)/SUS 316L (Sample ③) only showed the low electric resistance required (an electric resistance lower than a predetermined objective value).
   b) The Cr(single layer)/SUS 316L (Sample ⑤) could not show an electric resistance lower than the objective value, and was not included within the present invention.

[Contact Resistance Test-2]
A contact resistance test was conducted using the samples which included a test pieces according to the first embodiment of the present invention and a comparison example where an Au layer was formed on a base material and a carbon particle composite layer was further formed on the Au layer. The test results were compared with each other.

A corrosion generation was conducted according to FIG. 14. A contact resistance of each test piece was measured before and after the contact resistance test according to FIG. 17. In the measurement of the contact resistance, a pressure loaded on a test piece was set at 20 kgf/cm² substantially equal to an actual pressure of a fuel cell, and an electric current was set at 1A. An electric voltage V between opposite electrodes was measured, and a contact resistance R was calculated using the following equation:

$$R=V/I, \text{ where, } I=1A$$

1. Test piece (the same test pieces as those of CORROSION RESISTANCE TEST-2)
   The following test pieces (samples) were prepared:
   ① No treatment/SUS 316L—The base material was SUS 316L, and no surface treatment layer was formed.
   ② 10 nm Au sputter(single layer)/SUS 316L—The base material was SUS 316L, and a surface treatment layer of 10 nm Au single layer formed by sputtering. This sample was a comparison example.

③ 40 nm C/10 nm Au sputter/SUS 316L—The base material was SUS 316L, and a surface treatment layer including two layers of 10 nm Au layer formed by sputtering and C particle composite layer formed on the 10 nm Au layer. This sample was a comparison example.

④ C/CrC/Cr(three layers)/SUS 316L—The base material was SUS 316L, and a surface treatment layer of C/CrC/Cr(three layers) was formed. This sample belonged to the present invention and was of Variation I-type. The thicknesses of the C, CrC, and Cr layers are 50 nm, 50 nm, and 75 nm, respectively.

2. Test conditions

Corrosion condition: sulfuric acid solution of pH 2, 80° C.
Corrosion time period: 100 hours
Opposing electrode material: burn-formed carbon (graphite)

3. Test results

FIG. 19 shows the test results. The following test results were obtained:
 a) The 10 nm Au sputter(single layer)/SUS 316L (Sample ②), the 40 nm C/10 nm Au sputter/SUS 316L (Sample ③), and the C/CrC/Cr(three layers)/SUS 316L (Sample ④) only satisfied an objective (a contact resistance lower than a predetermined electric resistance).
 b) The C/CrC/Cr(three layers)/SUS 316L (Sample ④) has an electric resistance lower than that of the 40 nm C/10 nm Au sputter/SUS 316L (Sample ③).

From above, it can be seen that the separator according to the present invention has a corrosion resistance and an electric resistance more excellent than any of the separator with no surface treatment layer, the separator of Japanese Patent Publication 2000-67881 or equivalent thereof, and the comparison example (the separator having the Au layer and the carbon particle composite layer formed on the Au layer). Therefore, the separator of a fuel cell according to the present invention is suitable for use.

According to the present invention, the following technical advantages or effects can be obtained:

First, according to the separator of a fuel cell (according to the first embodiment of the present invention), since the surface treatment layer has a metal layer (the base material-side portion) between the carbon layer (the base material opposite-side portion) and the separator base material, bond between the carbon layer and the separator base material is increased. As a result, a corrosion resistance is improved and a long life is obtained. Further, since the carbon layer is formed at an atom level, generation of defects in the carbon layer is suppressed, so that a low electric resistance and a high corrosion resistance are obtained.

Second, according to the separator of a fuel cell (according to the second embodiment of the present invention), since the surface treatment layer further includes a carbon particle composite layer formed on the carbon layer formed at an atom level, the same technical advantages as those obtained due to the carbon layer formed at an atom level are obtained as they are. Further, a low electric resistance, a high corrosion resistance and a long life, which are obtained in a comparison example where an Au layer is formed on a base material and a carbon coating layer is further formed on the Au layer, can be obtained without using the noble metal, that is, at a low cost.

Third, in the separator of a fuel cell according to any of the first and second embodiments, various variations (for example, Variations I-XII) can be taken.

Fourth, according to the manufacturing method of the separator for a fuel cell according to any of the first and second embodiments of the present invention, since at least the carbon layer is formed by dry coating, the carbon layer can be manufactured at an atom level easily.

Although the present invention has been described with reference to specific exemplary embodiments, it will be appreciated by those skills in the art that various modifications and alterations can be made to the particular embodiments shown without materially departing from the novel teachings and advantages of the present invention. Accordingly, it is to be understood that all such modifications and advantages are included within the spirit and scope of the present invention as defined by the following claims.

What is claimed is:

1. A separator of a fuel cell comprising:
 a base material made of metal; and
 a surface treatment layer formed on said base material, said surface treatment layer including:
  a base material-side portion made from metal or semi-metal, or a carbide of said metal or semi-metal; and
  a base material opposite-side portion (i) including an outermost layer constant in composition concentration and (ii) made from carbon formed at an atom level, or composite materials of carbon and (a) said metal or semi-metal or (b) said carbide of said metal or semi-metal formed at an atom level,
 wherein said surface treatment layer includes at least two of said metal or semi-metal, said carbide of said metal or semi-metal, and carbon, and a portion of said surface treatment layer except said outermost layer inclines in concentration between said base material-side and said base material opposite-side and a composition ratio of said carbon in said portion of said surface treatment layer except said outermost layer is increased in a direction away from said base material.

2. A separator according to claim 1, wherein said surface treatment layer further includes a carbon particle composite layer formed on said base material opposite-side portion.

3. A separator according to claim 1, wherein said metal of said surface treatment layer is of a different kind from a metal of said base material.

4. A separator according to claim 1, wherein said surface treatment layer includes:
 a corrosion resistant layer formed on said base material, made from said metal or semi-metal or said carbide of said metal or semi-metal;
 an inclination layer formed on said corrosion resistant layer, including said carbon, and said metal or semi-metal or said carbide of said metal or semi-metal; and
 a carbon layer formed at an atom level, formed on said inclination layer,
 wherein said base material-side portion includes said corrosion resistant layer, and said outermost layer of said base material opposite-side portion includes said carbon layer.

5. A separator according to claim 1, wherein said surface treatment layer includes:
 an inclination layer formed on said base material, including said carbon, and said metal or semi-metal or said carbide of said metal or semi-metal, where a composition ratio of said carbon is increased in a direction away from said base material; and
 a carbon layer formed at an atom level, formed on said inclination layer,
 wherein said base material-side portion includes a portion of said inclination layer close to said base material, and said outermost layer of said base material opposite-side portion includes said carbon layer.

6. A separator according to claim 1, wherein said surface treatment layer includes:
   a corrosion resistant layer formed on said base material, made from said metal or semi-metal of a first kind or said carbide of said metal or semi-metal of said first kind;
   a first inclination layer formed on said corrosion resistant layer, including said metal or semi-metal of a second kind or said carbide of said metal or semi-metal of said second kind, and said metal or semi-metal of said first kind or said carbide of said metal or semi-metal of said second kind, where a composition ratio of said metal or semi-metal of said second kind or said carbide of said metal or semi-metal of said second kind is increased in a direction away from said base material;
   a second inclination layer formed on said first inclination layer, including said carbon, and said metal or semi-metal of said second kind or said carbide of said metal or semi-metal of said second kind, where a composition ratio of said carbon is increased in a direction away from said base material; and
   a carbon layer formed at an atom level, formed on said second inclination layer,
   wherein said base material-side portion includes said corrosion resistant layer, and said outermost layer of said base material opposite-side portion includes said carbon layer.

7. A separator according to claim 1 any one of claims 1 and 2, wherein said surface treatment layer includes:
   a first inclination layer formed on said base material, including said metal or semi-metal of a first kind or said carbide of said metal or semi-metal of said first kind, and said metal or semi-metal of a second kind or said carbide of said metal or semi-metal of said second kind, where a composition ratio of said metal or semi-metal of said first kind or said carbide of said metal or semi-metal of said first kind is increased in a direction away from said base material;
   a second inclination layer formed on said first inclination layer, including said carbon, and said metal or semi-metal of said first kind or said carbide of said metal or semi-metal of said first kind, where a composition ratio of said carbon is increased in a direction away from said base material; and
   a carbon layer formed at an atom level, formed on said second inclination layer,
   wherein said base material-side portion includes a portion of said first inclination layer close to said base material, and said outermost layer of said base material opposite-side portion includes said carbon layer.

8. A separator according to claim 1, wherein said surface treatment layer includes:
   a corrosion resistant layer formed on said base material, made from said metal or semi-metal or said carbide of said metal or semi-metal;
   an inclination layer formed on said corrosion resistant layer, including composite materials formed at an atom level, of said carbon and said metal or semi-metal or said carbide of said metal or semi-metal, and said metal or semi-metal or said carbide of said metal or semi-metal, where a composition ratio of said inclination layer is increased in a direction away from said base material; and
   a composite material layer formed on said inclination layer, formed in composite materials at an atom level, of said carbon and said metal or semi-metal or said carbide of said metal or semi-metal,
   wherein said base material-side portion includes said corrosion resistant layer, and said outermost layer of said base material opposite-side portion includes said composite material layer.

9. A separator according to claim 1, wherein said surface treatment layer includes:
   an inclination layer formed on said base material, including composite materials formed at an atom level, of said carbon and said metal or semi-metal or said carbide of said metal or semi-metal, and said metal or semi-metal or said carbide of said metal or semi-metal, where a composition ratio of said carbide of said metal or semi-metal is increased in a direction away from said base material; and
   a composite material layer formed on said inclination layer, formed in composite materials at an atom level, of said carbon and said metal or semi-metal or said carbide of said metal or semi-metal,
   wherein said base material-side portion includes a position close to said base material, of said inclination layer, and said base material opposite-side portion includes said outermost layer of said composite material layer.

10. A manufacturing method for a separator of a fuel cell including a metal separator of a base material and a surface treatment layer formed on said base material, said surface treatment layer including:
    a base material-side portion made from metal or semi-metal, or carbide of said metal or semi-metal; and
    a base material opposite-side portion (i) including an outermost layer constant in composition concentration and (ii) made from carbon formed at an atom level, or composite materials of carbon and (a) said metal or semi-metal or (b) said carbide of said metal or semi-metal formed at an atom level,
    said method comprising a step of forming said base material opposite-side portion by dry-coating including a physical vapor deposition;
    wherein said surface treatment layer includes at least two of said metal or semi-metal, said carbide of said metal or semi-metal, and carbon, and a portion of said surface treatment layer except said outermost layer inclines in concentration between said base material-side and said base material opposite-side, and a composition ratio of said carbon in said portion of said surface treatment layer except said outermost layer is increased in a direction away from said base material.

11. A method according to claim 10, further including a step of forming a carbon particle composite layer on said base material opposite-side portion.

* * * * *

UNITED STATES PATENT AND TRADEMARK OFFICE
CERTIFICATE OF CORRECTION

PATENT NO.         : 7,364,814 B2
APPLICATION NO.    : 10/452224
DATED              : April 29, 2008
INVENTOR(S)        : Hiromichi Nakata et al.

It is certified that error appears in the above-identified patent and that said Letters Patent is hereby corrected as shown below:

| Column | Line | |
|--------|------|---|
| 7      | 56   | Change "electric-chemically" to --electrochemically--. |
| 8      | 36   | After "plurality" insert --of--. |
| 18     | 43   | Change "pieces" to --piece--. |
| 21     | 29   | After "claim 1" delete "any one of claims 1". |
| 21     | 30   | Delete "and 2". |

Signed and Sealed this

Ninth Day of February, 2010

David J. Kappos
*Director of the United States Patent and Trademark Office*